US006415298B1

(12) United States Patent
Oesterer et al.

(10) Patent No.: US 6,415,298 B1
(45) Date of Patent: Jul. 2, 2002

(54) EFFECTIVE DATED TREE CONTROL IN A COMPONENT BASED-OBJECT ORIENTED CONVERGENT CUSTOMER CARE AND BILLING SYSTEM

(75) Inventors: Andreas U. Oesterer, Arlington, VA (US); Ian M. Campbell, Golden, CO (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/353,589

(22) Filed: Jul. 15, 1999

(51) Int. Cl.[7] .............................................. G06F 17/00
(52) U.S. Cl. ..................... 707/203; 707/514; 345/700
(58) Field of Search ............................. 707/3, 1, 103, 707/203, 103 R, 511, 514; 345/853, 835, 841, 855, 751, 700, 961; 705/1

(56) References Cited

U.S. PATENT DOCUMENTS

| | | | | |
|---|---|---|---|---|
| 4,646,229 A | * | 2/1987 | Boyle | 707/203 |
| 5,065,347 A | * | 11/1991 | Pajak et al. | 395/348 |
| 5,191,534 A | * | 3/1993 | Orr et al. | 364/468.12 |
| 5,317,729 A | * | 5/1994 | Mukherjee et al. | 707/3 |
| 5,339,392 A | * | 8/1994 | Risberg et al. | 345/333 |
| 5,386,545 A | * | 1/1995 | Gombos, Jr. et al. | 707/204 |
| 5,412,776 A | * | 5/1995 | Bloomfield et al. | 395/346 |
| 5,671,398 A | * | 9/1997 | Neubauer | 395/500.44 |
| 5,680,613 A | * | 10/1997 | Atsumi | 707/103 |
| 5,701,472 A | * | 12/1997 | Koerber et al. | 707/203 |
| 5,751,797 A | * | 5/1998 | Saadeh | 379/106.03 |
| 5,802,499 A | * | 9/1998 | Sampson et al. | 705/35 |
| 5,832,496 A | * | 11/1998 | Anand et al. | 707/102 |
| 5,862,325 A | * | 1/1999 | Reed et al. | 395/200.31 |
| 5,878,400 A | * | 3/1999 | Carter, III | 705/20 |
| 5,915,115 A | * | 6/1999 | Talati | 395/705 |
| 5,996,009 A | * | 11/1999 | Kitamura et al. | 709/223 |
| 6,038,550 A | * | 3/2000 | Rosenwald | 705/35 |
| 6,065,026 A | * | 5/2000 | Cornelia et al. | 707/531 |
| 6,243,091 B1 | * | 6/2001 | Berstis | 345/349 |
| 6,292,801 B1 | * | 9/2001 | Campbell et al. | 707/10 |

OTHER PUBLICATIONS

Kamita et al "A Database Architecture and Version Control for Group Work", Proceedings of the 27th annual Hawaii International Conference on System Sciences. IEEE 1994, pp. 438–447.*
Written Opinion for PCT/US99/16766 filed Jul. 26, 1999.
Kamita et al., A Database Architecture and Version Control for Group Work, Proceedings of the Twenty–Seventh Annual Hawaii International Conference on System Sciences. IEEE 1994, pp. 438–447, see p. 441.
PCT International Preliminary Examination Report issued on Jun. 13, 2001.
Internationl Search Report for PCT/US99/16766 filed Jul. 26, 1999.
"Software Library Management User Interface, Using Versioning" IBM Technical Disclosure Bulletin, U.S., IBM Corp., NY , vol. 37, No. 11, Nov. 1, 1994 pp. 251–253, XP000487227.
Ming et al., "Data exchange system for an integrated building design system" Automation in Construction, NL, Elsevier Science Publishers, Amsterdam, vol. 6, No. 2, May 1, 1997, pp. 147–155, XP004081661.

* cited by examiner

Primary Examiner—Safet Metjahic
Assistant Examiner—Uyen Le
(74) Attorney, Agent, or Firm—Staas & Halsey LLP

(57) ABSTRACT

A system that provides a graphical user interface showing relationships between effective dated objects in an object oriented system and showing modifications to the objects over time. The interface displays an effective dated tree control of persistent objects. The control shows past, current and future events associated with the objects represented in the control. Related persistent objects are found in a database and marked as active responsive to the effective dates. The objects can be selected ("clicked-on") and additional details of the objects are displayed.

9 Claims, 8 Drawing Sheets

Microfiche Appendix Included
(5 Microfiche, 414 Pages)

CUSTOMER TABLE

| CUSTOMER ID | EFFECTIVE DATE | STATUS | ADDRESS |
|---|---|---|---|
| C1 | 01-JAN-1999 | ACTIVE | LITTLE STREET |
| C1 | 01-APR-1999 | ACTIVE | BIG AVE |

— 172
— 174
— 176

ACCOUNT TABLE

| CUSTOMER ID | ACCOUNT ID | EFFECTIVE DATE | STATUS | PAYMENT |
|---|---|---|---|---|
| C1 | A1 | 01-JAN-1999 | ACTIVE | INVOICE |
| C1 | A1 | 01-MAY-1999 | ACTIVE | CREDIT CARD |
| C1 | A1 | 30-JUN-1999 | ACTIVE | INVOICE |
| C1 | A2 | 01-JAN-1999 | ACTIVE | CREDIT CARD |
| C1 | A2 | 15-FEB-1999 | DEACT | |
| C1 | A3 | 01-AUG-1999 | ACTIVE | INVOICE |

EFFECTIVE DATED TREE CONTROL IN A COMPONENT BASED-OBJECT ORIENTED CONVERGENT CUSTOMER CARE AND BILLING SYSTEM

REFERENCE TO MICROFICHE APPENDIX

A microfiche appendix having 5 microfiche and 414 frames is included herewith.

BACKGROUND OF THE INVENTION

1. Field of the Invention

The present invention is directed to a mechanism used to view effective dated persistent objects and their relationships and, more particularly, to a system which provides a simplified graphical user interface including a tree control for viewing and obtaining detailed information about the objects.

2. Description of the Related Art

Complex systems today are typically implemented using object oriented languages. The objects of such systems need to be updated over time, and an historical record of these updates needs to be available in the user interface. The objects can also have complex relationships between them.

What is needed is a system that displays an intuitive representation of related objects over effective dated time intervals.

SUMMARY OF THE INVENTION

It is an objective of the present invention to use object oriented technology to display complex information in a visually descriptive and flexible manner.

It is another objective of the present invention to provide an intuitive graphical user interface for viewing and manipulating effective dated persistent objects.

It is also an object of the present invention to provide a user with the ability to view the objects with user specified time periods.

It is a further object of the present invention to provide a display that allows the user to view effective dated relationships and future dated changes simultaneously.

It is an additional object of the present invention to provide an interface that allows the user to drill down or obtain additional information about the objects.

The above objects can be attained by a system that provides a graphical user interface and process for creating the interface that displays an effective dated tree control. The control shows past, current and future events associated with the objects represented in the control. The control also allows the user to select the objects and display their information.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 depicts table contents;

DESCRIPTION OF THE PREFERRED EMBODIMENTS

Figure 1:
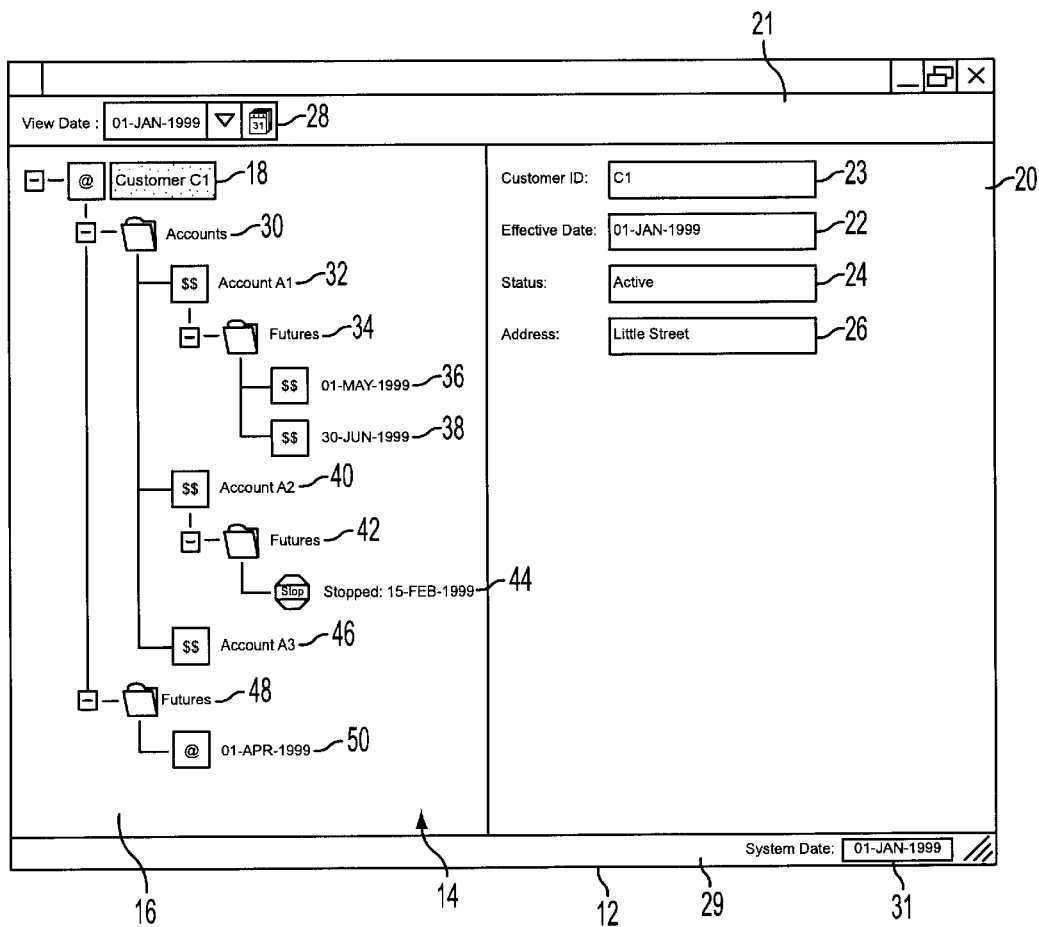
FIG. 1 depicts a graphical user interface of an effective tree control showing a customer.

Before discussing the features of the invention a summary of the terms used in the discussion herein will be provided. Persistent Storage is storage residing on a persistent medium which is usually a database or file. A Primary Key includes data elements used to identify a persistent entity in persistent storage. An Object is a program module that combines data and state or process. A Persistent Object is an object where the state can be stored and retrieved from a persistent storage. An Entity is a real-world noun modeled as a persistent object. An Effective Date is a date on which an entity becomes effective or active. An Effective Dated Object represents a logical grouping of multiple effective dated entries. An Effective Dated Entry represents a time slice of an effective dated object. Each entry represents a state change of the effective dated object. The entry contains a date indicating when the entry becomes effective or active. A Control is a graphical and/or functional element that can be reused across graphical user interface (GUI) applications and which the user can select and activate to get additional information. A control, in a graphical user interface, is an object on the screen that can be manipulated by the user to perform some action. A button is a common type of control. A file folder or a text appearing on a display can function as controls. A Tree Control is a graphical control element that allows the graphical interface user to examine hierarchically organized data. An Effective Dated Tree Control is a specialization of a standard tree control to view effective dated information.

The present invention provides a simplified graphical interface mechanism to view effective dated persistent objects and their relationships. It provides the graphical interface user with the ability to inspect data in the system using different date settings, referred to as the view date, at virtual observation points in time. This provides the graphical interface user with the ability to view future, current or past dated information. Further, the invention allows the graphical interface user to view all future dated entries for the effective dated object within the system. For example, the graphical interface user can set the view date one month ahead of the system date and can inspect what data will be active in one months time and interpret how the system will behave.

Modern Customer Care and Billing Systems are implemented using object oriented paradigms. These systems contain many business objects, such as an account object or a customer object. A business object contains business data and business functionality or logic. Business objects can be stored as persistent objects in persistent storage. To keep track of updates to a persistent object, the object can be stored with an effective date as part of the primary key. The effective date indicates the point in time at which the entry becomes effective. A persistent object is usually made effective dated for legal obligations or functional requirements. For example, an address change for a customer can be added to the system a month before the new address becomes relevant for processing. It can be required by law to keep all information related to billing for a certain time period.

Effective dating provides a mechanism to maintain a history of past information in the system without affecting the current processing data. Functional requirements to reenact past scenarios or to setup future services can also be implemented using effective dated objects. A logical object, such as a particular account, can consist of multiple entries in the persistent storage, but only one entry is active at any one point in time.

Business objects maintain relationships to other business objects. For effective dated objects these relationships are affected by the effective date and can change over time. An example is a customer, which is an object, having an account, which is another object, that will be activated in a month's time. For current processing this account is not considered. The account will not become active for that customer until the system date passes the effective date.

The problem this invention solves is to display this complex information to the user in an intuitive and visually understandable as well as flexible manner.

The effective dated tree control of the present invention incorporates two paradigms, the view date paradigm and the historical object view. These two paradigms involve future actions and historical viewing. Future Actions describe the ability to make a change to an object which is not active until some future date. The user can view the current object relationships (view date set to today) and make a change at some future date. The user can also view the future object and its relationships (view date set to the day of the future dated change) and make a change on that future date. Historical viewing allows the user to view the history of objects. Past dated versions of objects can be displayed by setting back the view date. All future dated versions of an object can be viewed in a Future folder.

The view date specifies the virtual observation point in time the system uses to retrieve and display the data. The view date is defaulted to the system date but can be modified to reflect a future or past date.

The historical object view allows browsing all updates for an effective dated object over time. The historical view can be attained by setting the view date to before or equal to the earliest date in the object.

A specialized tree control is used to display a hierarchical order of persistent objects. Objects having relationships to other objects contain a folder node that contains the related objects. When selecting a node in the tree, the data or attributes of the objects can be viewed or modified in a detail display area or view port. A highlighted object has it's data displayed in the associated display area.

The user interface displays all objects active from the view date to infinity. This includes objects that are future dated and not currently active. To distinguish between currently active objects and future dated objects, the currently active objects are displayed marked in the tree view. The marking could show the text in bold, reverse text, blinking, etc. or some other way that sets the marked objects out from the unmarked objects.

Each effective dated object can have a future folder that contains all the future effective dated entries of the object. In the futures folder, each effective dated object contains the effective date in the display text.

The objects displayed are sorted so that the earliest date is on top and the furthest in the future is on the bottom. If a deactivation entry exists, it is put as a last entry in the folder and is marked with the text "Stopped", "Deactivated" or "Terminated" along with the stop date and an appropriate node icon.

To support this display mechanism efficiently, the interface to the persistent storage provides two query functions. The first function conventionally queries the persistent storage for associated objects and returns only the first entry for currently active or future objects. This query is used to identify all related objects. The second function conventionally queries the persistent storage for all future updates existing for a particular effective dated object. This query takes into account the previous query, filtering the active entry or the first future entry as appropriate. This query is used to populate the futures folder for all effective dated objects.

An example of a graphical user interface 12, according to the present invention, is depicted in FIG. 1. The example GUI allows browsing and modifications of Customer and Account objects. Both business objects are effective dated. An effective dated tree control 14 is shown in a display area or view port 16 on the left side of the interface 12 with a customer object 18 currently highlighted.

Attributes or data of the highlighted object 18 are shown on the right side of the interface in display area or view port 20. If a customer object is selected, the view port 20 shows customer information fields for information such as the customer ID 23, the effective date 22, the effective status 24 and the address 26 for the selected customer. A tool bar 27 contains a date control 28 that is used to set the view date. A status bar 29 contains a date control 31 used to display the system date. The system date cannot be modified by the user and is provided by the application server. For this example the system date 31 and the view date 28 are set to 01-JAN-1999.

Figure 5:
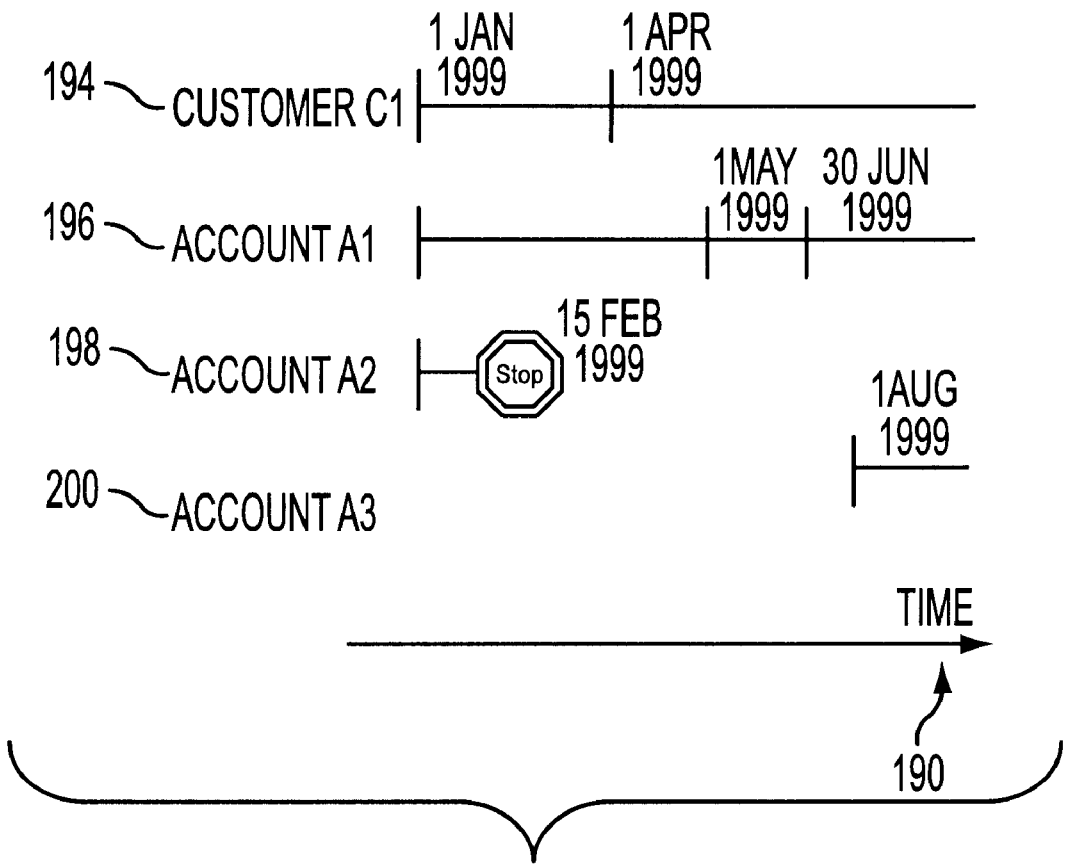
FIG. 5 shows the time relationships between events of the tables.

The effective dated tree control 14 depicted in FIG. 1 shows the following objects which are shown in FIGS. 4 and 5 representing contents of the persistent storage. A root node of the tree 14 is a tree node 18 representing the logical customer object 194 and the effective dated entry 174. The customer tree node 18 as well as being highlighted is displayed in bold (marked) because the entry 174 is effective on the system date 31. The tree node 18 contains an account folder 30. The account folder 30 contains all logical account objects related to the logical customer object 194 that are active on the view date 28 or will be active in the future relative to the view date 28. The tree node 32 represents the logical account object 196 and also represents the data entry 180 active on the view date 28. Because this entry 180 is effective on the system date 31, the tree node 32 is displayed in marked (in this case bold). Because entries in the future, relative to the view date 28, exist for the logical account object 196, a futures folder 34 is contained underneath the account tree node 32. The futures folder contains two nodes 36 and 38 that each represent an effective dated entry in the persistent storage 182 and 184. These tree nodes 36 and 38 are not bold since neither of the entries is effective on the system date 31. The account folder 30 further contains a tree node 40 that represents the logical account object 198 and effective dated entry 186. Because this entry 186 is effective on the system date 31, the tree node 40 is displayed marked (bold). Because entries in the future, relative to the view date 28, exist for the logical account object 198, a futures folder 42 is contained underneath the account tree node 40. The futures folder contains one node 44 that represents an effective dated entry 188 in the persistent storage. Since this entry 188 is a deactivation entry, the tree node 44 is marked with the appropriate deactivation icon and text. The last node contained in the account folder 30 is the tree node 46 representing the logical object 200 and the effective dated entry 190. The tree node 46 is not bold because the entry 134 is not active on the system date 31. The tree node 46 does not contain a futures folder since no more entries for the logical object 200 exist. The customer tree node 18 also contains a futures folder 48 since entries in the future, relative to the view date 28, exist for the logical customer object 194. The futures folder 48 contains one tree node 50 representing the effective dated entry 176.

The tree control 14 can be used like any other windows tree control type hierarchy to drill down to deeper levels of information. For example, a folder can be conventionally activated ("double clicked-on"—selected and the underlying control activated) to show the contents of the folder, in the way windows based interfaces allow folders to be opened. An object such as a customer can be selected and activated to show details about the customer object as are illustrated in FIG. 1. FIG. 1 will also be used in a later discussion herein to illustrate how the effective dated tree control changes.

Figure 2:
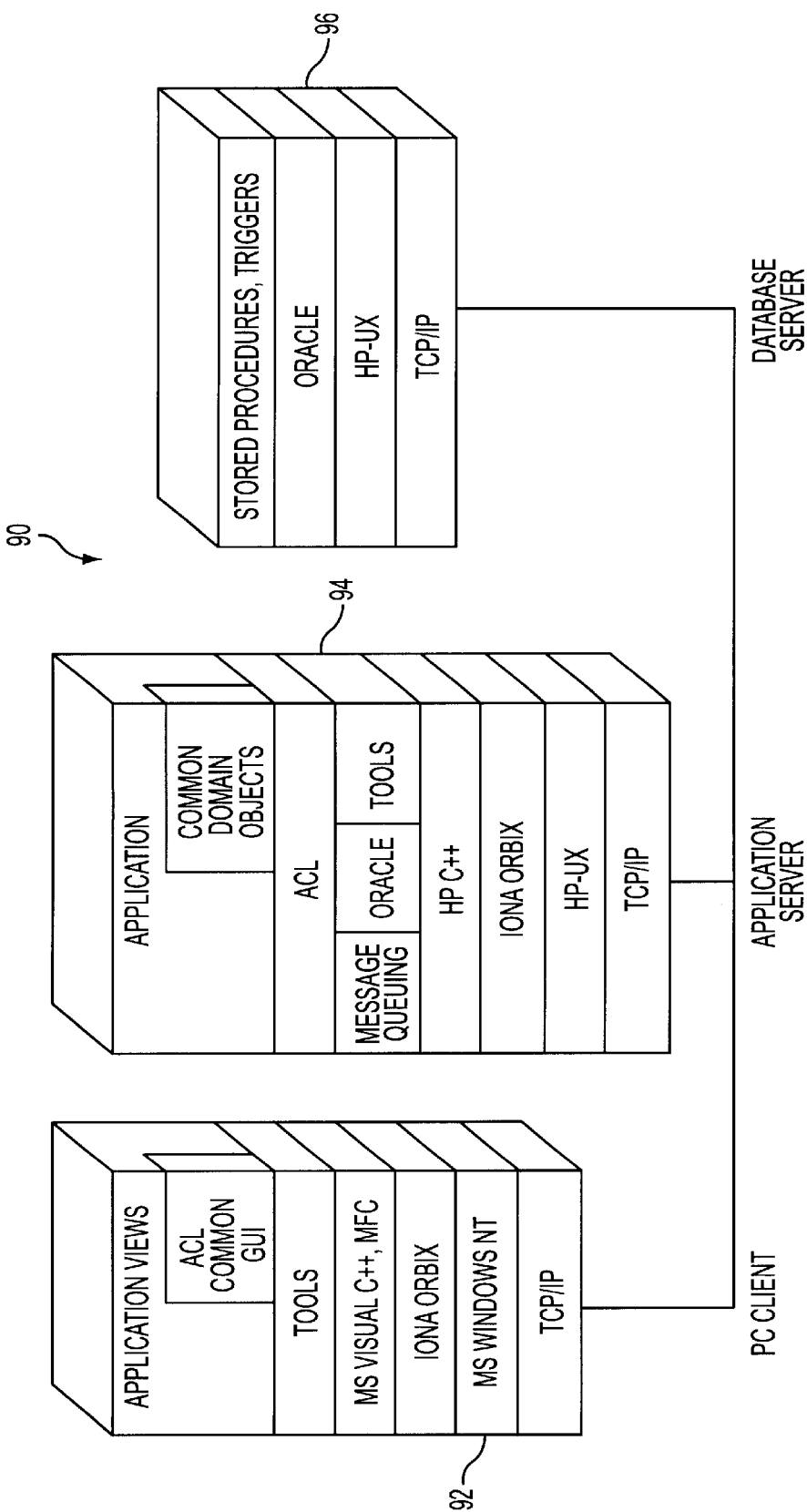
FIG. 2 shows preferred hardware and software layers of the present invention.

The system 90 of the present invention is preferably implemented in a three-tier client server system, as depicted in FIG. 2, which includes a client personal computer 92 of the desk top computer class coupled to an application server computer 94 and a database server computer 96, both of the server computer class. The user interface 12 is preferably implemented using a Microsoft Foundation Classes (MFC) framework operating on Windows NT. The software of the application server component 94 is preferably implemented using C++ preferably running on a HP-UNIX platform. The system database server preferably uses an Oracle database system to store persistent objects. The client to server communication preferably uses Orbix technology. The personal computer 92 includes a display (not shown) that will display the GUI and a control device (not shown) such as a mouse or a keyboard that will allow the user to manipulate the tree 14 and drill down into the tree 14 by making control selections on tree elements. The system 90 also includes storage, such as disk storage, suitable for storing or distributing the processes of the present invention. The processes of the invention can also be distributed over a network, such as the Internet.

The effective dated tree control 14 is implemented as a specialization of the MFC tree control class. The tree control 14 interacts with business object clients to construct the tree to be displayed to the user. The business object clients provide functionality to get all related business objects and the future updates for business objects. These functions are preferably implemented as distributed functions and executed on the application server 94. The application server 94 uses conventional query functions to provide the data requested by the GUI 12. The software of the client 92 also provides the user with the conventional ability to modify the view data. The data displayed to the user is retrieved from the server 96 using the view date as a virtual observation point in time.

Figure 3:
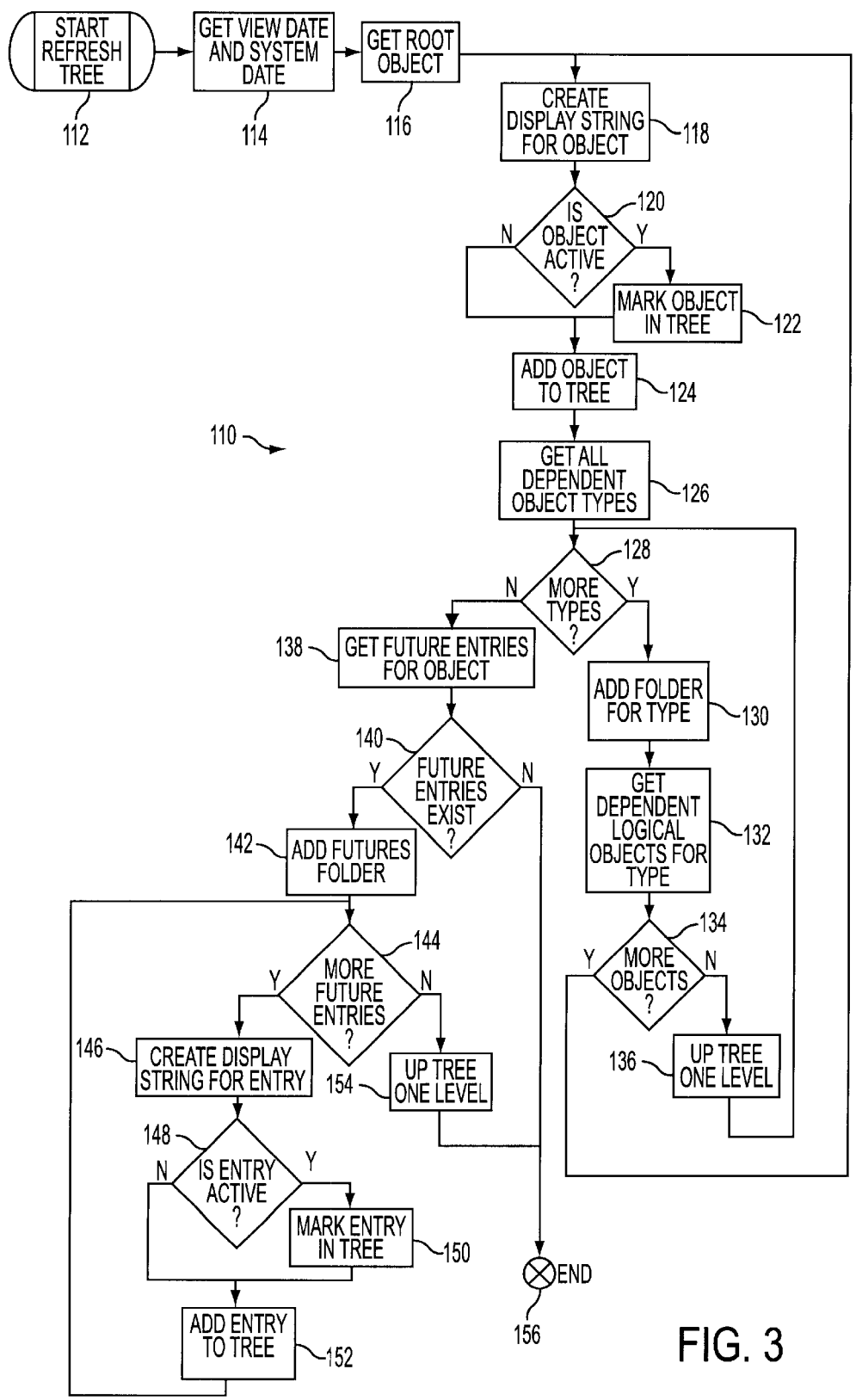
FIG. 3 is a flowchart of the refresh tree process.

A process 110, as depicted in FIG. 3, used to refresh the tree control is executed when the control is initialized or when executed transactions make it necessary to refresh the information contained on the tree. Such transactions can include moving of nodes, changing the view date, delete or add operations. When this process 110 is executed the tree control 14 is empty and the hierarchy is set to the root level.

The process, once started 112, first retrieves 114 the view date from the view date field of the GUI and system date from the system clock object, these two dates are used when populating the tree 14. The next process operation 116 is to locate the root object, this object is used as the root of the tree. The system retrieves the data, of the root object, effective on the view date. The process now enters a section that is called recursively for each object added to the tree. A display string for a current object is created 118 according to business rules (for example, Customer, CustomerID). The process then determines 120 if the current object's data is active on the system date using the object's effective date. If the current object is active, it is marked 122 when added to the tree. The current implementation uses a bold display string or bold symbol to mark entries that are active on the system date. The current object is added 124, at the current hierarchy level, to the tree. The next operation is to determine 126 all the types of dependent objects for the current object. For example, a customer object could have accounts, subscriptions and addresses as dependent objects. For each type 128 of dependent object type a folder is added 130 to the tree. When a folder is added, the hierarchy of the tree is set to this folder. Next all dependent objects for a type are retrieved 132, that are either active on the view date or become active in the future relative to the view date. For each 134 discovered object the recursive part of the process is executed. Once all objects of a type have been processed, the hierarchy of the tree is set 136 to the parent object of the current folder. Once all types of dependent objects have been processed, the entries existing in the future, relative to the view date, are retrieved 138. If future entries exist 140, a futures folder is added 142. While future entries exist 144, a display string is created 146, the entry is checked 148 to see if it is active, marked 150 if active and all futures entries are added 150 to the folder. Once all future dated entries have been processed, the hierarchy of the tree is set 154 to the parent object of the current folder and the process exits 156. The process of the present invention discussed herein is described in more detail in the Appendix.

The process used to populate the tree resides on the PC client 92. The process calls conventional functions to retrieve persistent objects and these functions are implemented on the application server. The application server 94 issues conventional queries to the database server 96 that stores all persistent objects. If necessary, the application server 94 performs formatting and returns the data to the PC client 92.

The following discussion describes a possible history or sequence of interactions between a Telephone Company and a customer. The interactions described are stored in persistent storage and the customer service representative managing the customers account can review the customer's configuration of accounts and other services.

In December 1998, the customer calls the Telephone Company and signs up for service starting Jan. 1, 1999. The customer signs up for fixed wire and wireless services and wishes to be billed for both services separately.

The customer's address is Little Street, the fixed wire account will be billed with an invoice, and the wireless account will be charged to the customer's credit card. The system creates an entry for the customer record 174 and two account entries 180 and 186, one for each of the accounts. The customer is assigned the ID C1, the fixed wire account A1 and the wireless account A2.

On Feb. 15, 1999, the customer is not satisfied with the wireless service and cancels the account. The system creates a deactivation entry 188 for account A2.

Early March 1999, the customer calls and tells the Telephone Company that he will move to Big Ave on Apr. 1, 1999. The system creates a future dated entry 176 for the customer reflecting the address change.

In April 1999, the customer calls and tells the Telephone Company that he wishes all charges for account A1 in May and June to be charged to his credit card since he will be out of the country. The system creates two future dated entries 182 and 184 in the system switching the account to credit card payment and back to normal invoicing after the requested period.

On Aug. 1, 1999, the customer calls and signs up for a business calling card that will be billed separately. The system creates account A3 (190) for the customer.

After all the interactions described above are completed, the persistent store contains the data set forth in FIG. 4. A customer table 172 contains two entries 174 and 176 for the addresses with appropriate effective dates. An account table 178 includes six entries for the different accounts 180, 182, 184, 186, 188 and 190 with corresponding effective dates. The logical view 192, as depicted in FIG. 5, shows logical objects 194, 196, 198 and 200 along with the modifications applied to the logical objects over time.

Figure 6:
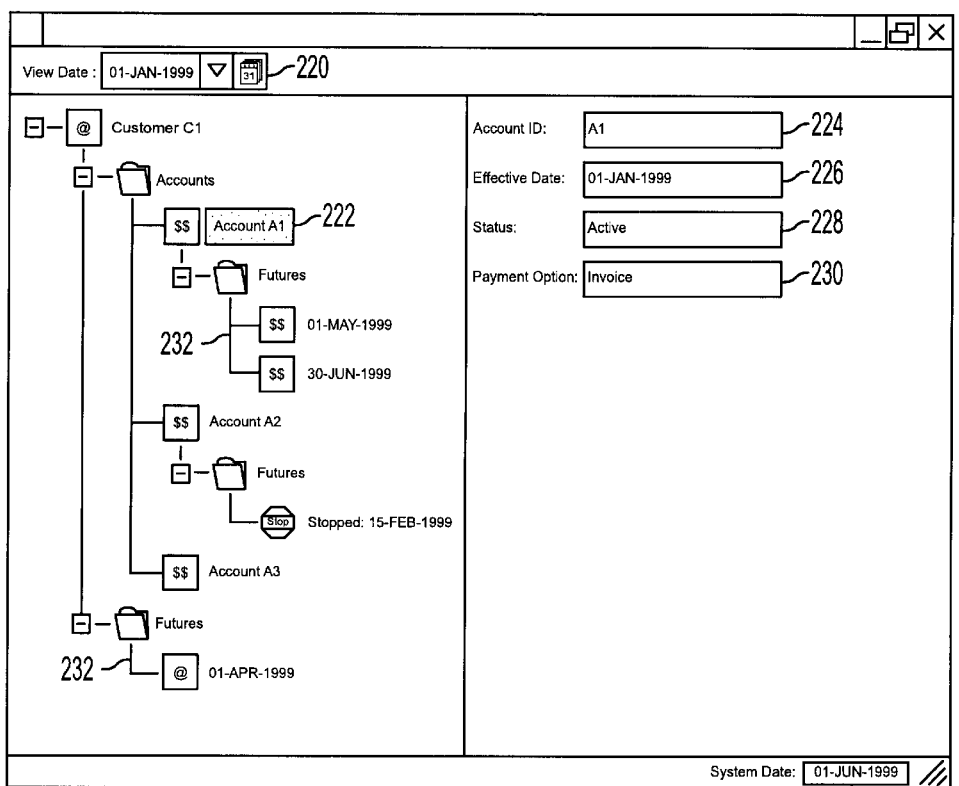
FIGS. 6–8 provide time dependent views of an effective dated tree.

Several scenarios will now be discussed to illustrate the way in which the GUI changes as the view date changes. For the scenario depicted in FIG. 6 the system date 218 is set to 01-JUN-1999 and the view date 220 is set to 01-JAN-1999. The important differences, with respect to the scenario depicted in FIG. 1, include the display showing an account 222 highlighted in the tree rather than a customer and the right side depicting the attributes of the selected account. In this example account information fields for information such as account ID 224, effective date 226, effective status 228 and payment option 230 are displayed for the selected account. Comparing FIGS. 1 and 6 also illustrate how different system dates 218 affect which tree nodes 232 are displayed marked (bold). All other information is identical to the scenario depicted in FIG. 1.

Figure 7:
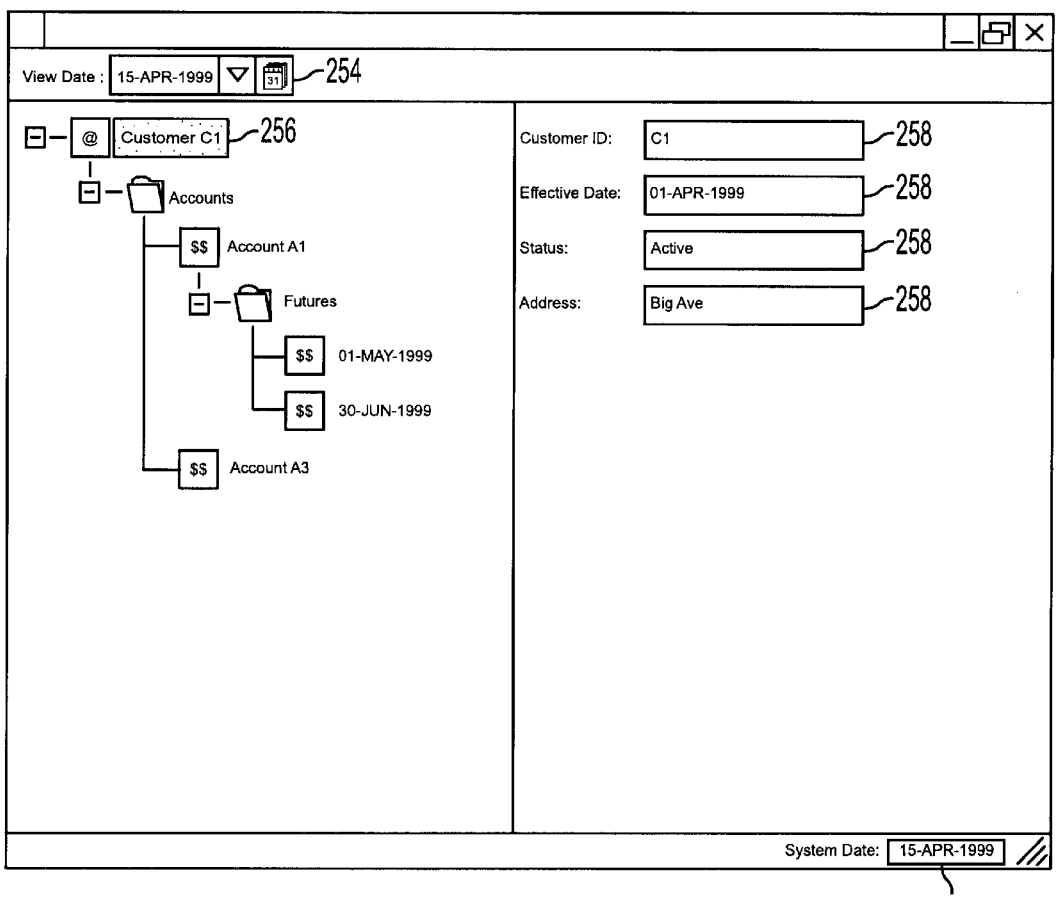

For the scenario depicted in FIG. 7 the system date 252 and the view date 254 are set to 15-APR-1999. The important differences with respect to the scenario depicted in FIG. 1 include the logical account object 198 being not contained in the account folder since the object was deactivated prior to the current view date. The selected object 256 represents the logical object 194 and the effective dated entry 176. The data of the selected object is displayed on the right-hand side 258. The customer tree node does not contain a futures folder since no further updates for the logical customer object 194 exist.

Figure 8:
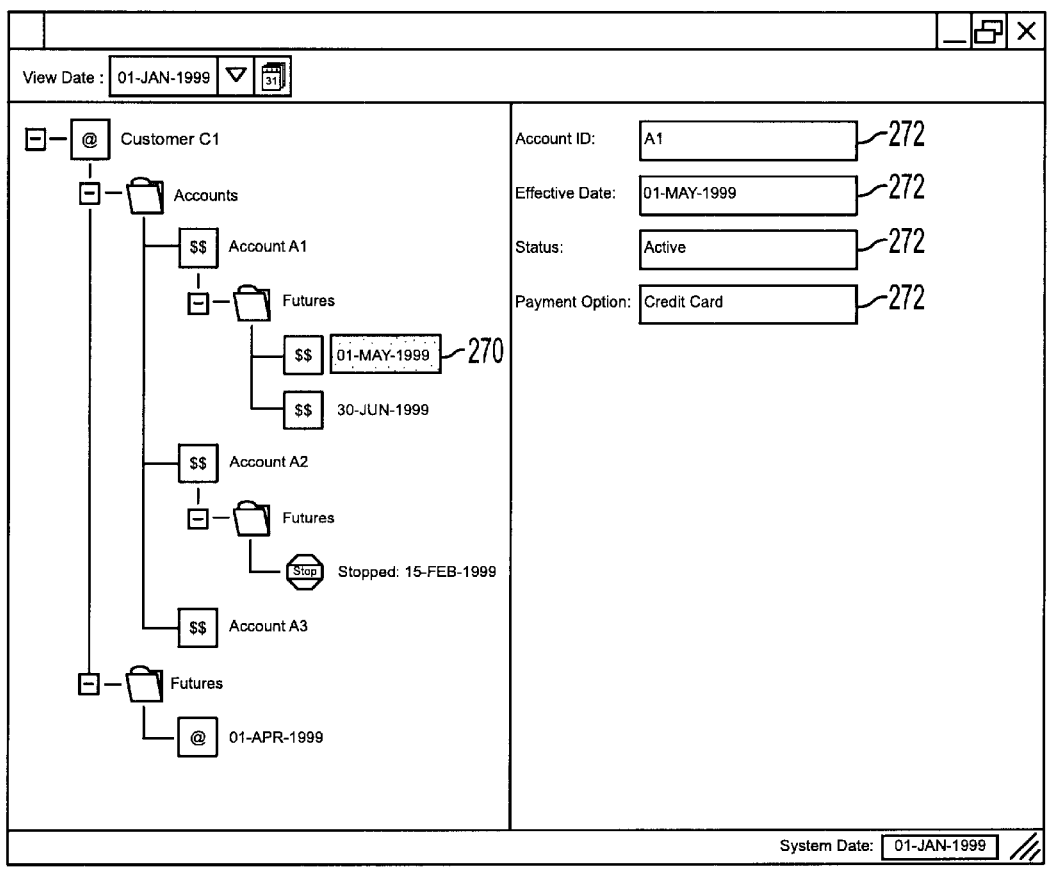

For the example of FIG. 8 the system date and the view date are set to 01-JAN-1999. The important difference with respect to the scenario depicted in FIG. 1 is that the selected object 270 is an effective data entry 182 contained in a future folder and does not represent a logical object. The data displayed on the right-hand side 272 is the data of the effective dated entry 182 associated with the tree node.

The tree control of the present invention not only shows the event dates associated with persistent objects of a system such as a customer care and billing system but allows the user to activate the object to drill down for underlying information.

The present invention has been described with respect to particular hardware and software being used in the preferred embodiment. The same solution can be achieved by using different hardware platforms or different programming languages. Further, the architecture used in the present invention need not be a distributed architecture. The keywords or mechanisms used to indicate active objects, future updates, view date can also vary. The invention can be also be used to browse and modify the business data where multiple versions are maintained. The layout of the graphical user interface may also vary.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A customer care and billing display, comprising a graphical user interface showing, in a same view, relationships between effective dated customer, account and data objects of a customer care and billing system and modifications of the objects over time, said interface comprising:

a view date field showing a view date;

a system date field showing a system date;

a tree view port with a tree having a structure controlled by the view date, having branches showing relationships between different objects, showing effective dates and showing objects with effective dates equal to or after the view date with objects marked that are effective on the system date, and with the objects being controls activatable to access object data; and a data view port showing the object data of a control activated object.

2. A display, comprising a graphical user interface showing, in a same view, relationships between effective dated objects and modifications of the objects over time, said interface comprising:

a view date field showing a view date; and a tree view port with a tree control having a structure controlled by the view date, having branches showing relationships between different objects, showing effective dates and showing objects with effective dates equal to or after the view date with objects marked that are effective on the system date, and with the objects being controls activatable to access object data.

3. A method, comprising:

searching an object database for related objects; and displaying a tree control as part of a graphical user interface, where the tree control presents a view of effective dated business data objects with respect to a user definable view date, where the tree control presents a tree having branches showing relationships between different business data objects using folder and node controls, where the tree control displays all business data objects effective on the view date, modifications to effective business data objects that will become effective in the future relative to the view date and business data objects that will become effective in the future relative to the view date, where the business data objects that are effective on a system date are marked for distinction from business data objects that will become effective after the system date or that have been superseded before the system date.

4. A method as recited in claim 3, wherein modifications of business data objects that are effective on the view date, that will become effective in the future relative to the view date are placed in a labeled folder control indicating future effective dated objects and where the labeled folder control is placed in the tree hierarchy beneath the corresponding business data object.

5. A method as recited in claim 4, wherein modifications, of business data objects that are effective on the view date, that are placed in the folder control are labeled with the effective date to indicate the point in time at which the modification becomes effective.

6. A method to display a tree control as part of a graphical user interface as cited in claim 31, wherein if a business data object is one of terminated, canceled and deactivated in the future relative to the view date, the business object is placed as a tree node in a future labeled folder control where the future labeled folder control is placed in the tree hierarchy beneath the corresponding business data object.

7. A method as recited in claim 3, wherein business data objects that have been one of terminated, canceled and deactivated before the view date are not shown in the tree control.

8. A method as recited in claim 3, further comprising displaying a data view port displaying the data of the business data object selected in the tree control where the view port displays one of read only data and allows object data to be modified.

9. A method as recited in claim 3, further comprising allowing a user to modify a view date using a GUI date control setting the view date to any date in the past, present or future relative to the system date and updating the structure of the tree control and data displayed in the tree control responsive to the modification of the view date.

* * * * *